United States Patent
Kredo et al.

(10) Patent No.: US 7,020,262 B2
(45) Date of Patent: Mar. 28, 2006

(54) WEB BASED PERSONAL DIRECTORY

(75) Inventors: Thomas J. Kredo, Rochester, NY (US); Stephen Knight, Rochester, NY (US)

(73) Assignee: Nortel Networks, Ltd., St. Laurent (CA)

(*) Notice: Subject to any disclaimer, the term of this patent is extended or adjusted under 35 U.S.C. 154(b) by 5 days.

(21) Appl. No.: 10/777,696

(22) Filed: Feb. 12, 2004

(65) Prior Publication Data

US 2004/0161095 A1 Aug. 19, 2004

Related U.S. Application Data

(63) Continuation of application No. 09/193,277, filed on Nov. 17, 1998, now Pat. No. 6,714,641, which is a continuation-in-part of application No. 09/054,681, filed on Apr. 3, 1998, now Pat. No. 6,259,771.

(51) Int. Cl.
*H04M 1/64* (2006.01)
*H04M 3/00* (2006.01)

(52) U.S. Cl. ............. 379/218.01; 379/142.04; 379/142.15; 379/88.16; 379/88.17; 379/88.18; 379/265.01; 379/265.09; 379/67.1; 379/72; 379/76; 379/88.07

(58) Field of Classification Search ......... 379/88.11, 379/88.12, 88.19, 218.01, 142.04, 142.15, 379/88.17, 88.18, 265.09, 67.1, 72, 76
See application file for complete search history.

(56) References Cited

U.S. PATENT DOCUMENTS

| | | | |
|---|---|---|---|
| 4,797,910 A | 1/1989 | Daudelin | |
| 5,325,421 A | 6/1994 | Hou et al. | |
| 5,483,586 A | 1/1996 | Sussman | |
| 5,652,789 A | 7/1997 | Miner et al. | |
| 5,724,412 A | 3/1998 | Srinivasan | |
| 5,850,433 A | 12/1998 | Rondeau | |
| 5,884,262 A | 3/1999 | Wise et al. | |
| 5,915,001 A * | 6/1999 | Uppaluru | 379/88.22 |
| 5,978,806 A | 11/1999 | Lund | |
| 6,014,634 A | 1/2000 | Scroggie et al. | |
| 6,031,836 A | 2/2000 | Haserodt | |
| 6,038,296 A | 3/2000 | Brunson et al. | |
| 6,049,594 A * | 4/2000 | Furman et al. | 379/67.1 |
| 6,052,439 A * | 4/2000 | Gerszberg et al. | 370/401 |
| 6,065,016 A | 5/2000 | Stuntebeck et al. | |
| 6,069,890 A | 5/2000 | White et al. | |
| 6,091,808 A * | 7/2000 | Wood et al. | 379/201.04 |
| 6,097,793 A | 8/2000 | Jandel | |
| 6,125,113 A | 9/2000 | Farris et al. | |
| 6,229,810 B1 * | 5/2001 | Gerszberg et al. | 370/401 |
| 6,259,771 B1 | 7/2001 | Kredo et al. | |
| 6,404,877 B1 * | 6/2002 | Bolduc et al. | 379/218.01 |

OTHER PUBLICATIONS

U.S. Appl. No. 09/193,277, filed Nov. 1998, Kredo et al.

* cited by examiner

*Primary Examiner*—Allan Hoosain
(74) *Attorney, Agent, or Firm*—John C. Gorecki

(57) ABSTRACT

A personal directory system 10 has a translation server 40 for verifying the identity of a subscriber and recognizing the name of one or more subscribers that are stored on a personal directory of another subscriber. A caller is connected by a public telephone switch to the server 40 that accesses a personal directory computer 60 located on the World Wide Web 50. The requested number and/or speed dial number are converted from text to speech and the public telephone switch automatically dials the requested number.

18 Claims, 1 Drawing Sheet

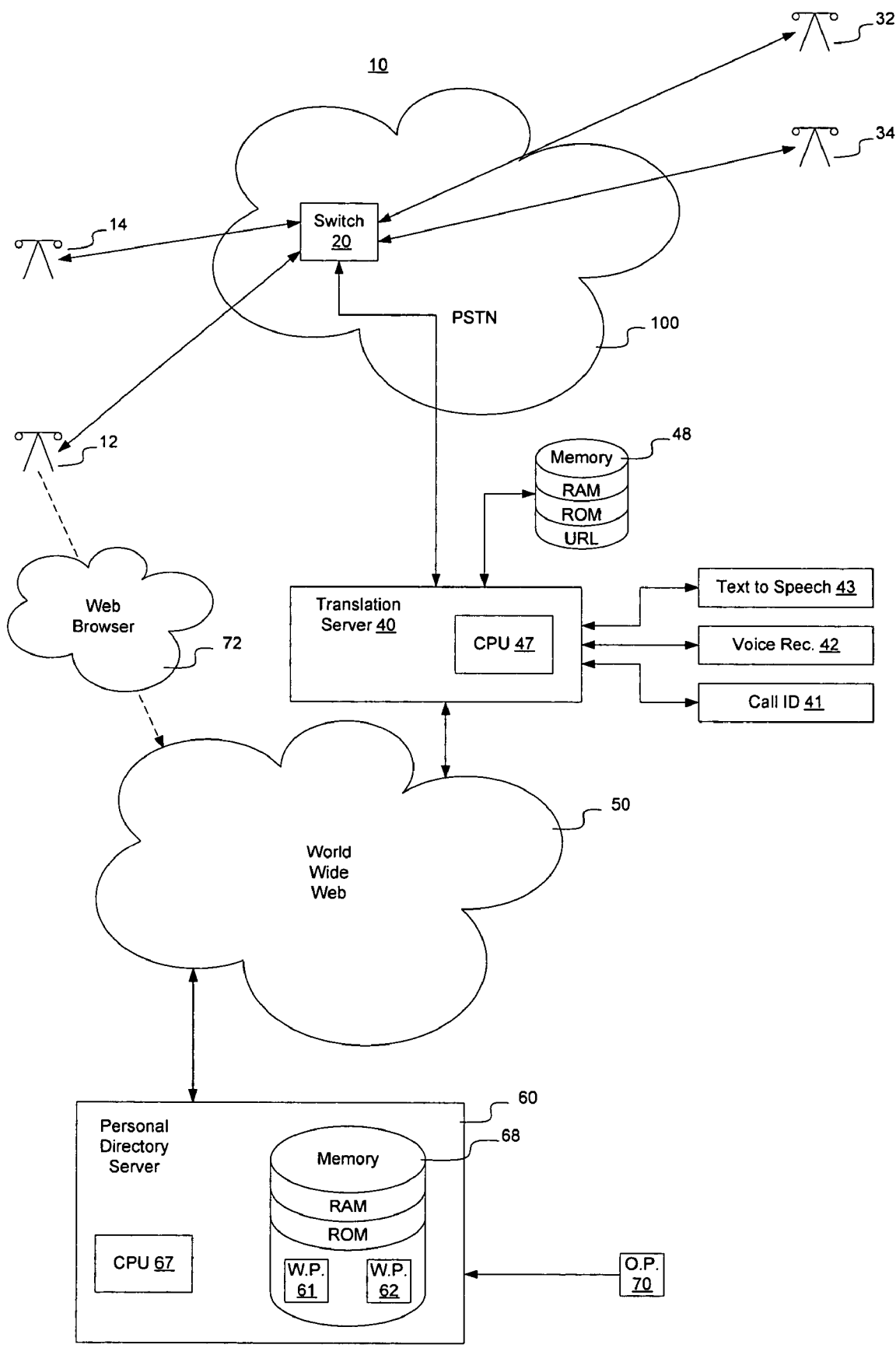

WEB BASED PERSONAL DIRECTORY

This application is a continuation of prior U.S. patent application Ser. No. 09/193,277, filed Nov. 17, 1998, now U.S. Pat. No. 6,714,641, which is a continuation-in-part of U.S. patent application Ser. No. 09/054,681, filed Apr. 3, 1998, now U.S. Pat. No. 6,259,771, the entire disclosure of each of which is herein incorporated by reference. This invention relates in general to interactive voice response systems and, in particular, to such systems having personal directories stored on a web site.

FIELD OF THE INVENTION

BACKGROUND OF THE INVENTION

Telephone companies have long offered directory assistance service. A typical caller dials a special number, such as "411" for directory assistance. Often the caller who requests assistance is connected to an operator. Recent advances in voice recognition systems permit 411 services to connect the caller to a voice recognition computer. The computer has a store of digital files, including prompts for the caller. In response to information provided by the caller, the voice recognition system either identifies the requested subscriber phone number or passes the call to an operator.

The operator and the voice recognition system have access to one or more computers that store the telephone numbers for local and long-distance subscribers. Subscriber telephone numbers are stored in accordance with subscriber data. Such data includes the name of the subscriber and the subscriber location including street address, city or town, and state. After the 411 service acquires the requested phone number, the number is usually automatically announced to the caller. The announcement is a computer-generated voice signal that gives the caller the requested subscriber phone number. Advances in directory assistance technology allow the directory assistance equipment and its caller to interact. Now a caller can choose to let the directory assistance equipment automatically place the call to the requested phone number. The announcement directs the user to press a specified key on the telephone pad or say "yes" if the user wants the directory assistance equipment to dial the number. Often there is a charge for automatic connection.

After a customer pays for directory assistance, the customer may manually make a permanent record of the desired number in a personal directory. The directory may be a book, part of a personal organizer, digital assistant, or in a database that stores information on a computer. Some frequently called numbers may be stored in the telephone where they can be selected for speed dialing. Selecting a programming key on the telephone to access the feature normally activates a conventional speed-dialing feature. Then the desired number is dialed into the telephone and becomes associated with an abbreviated dialing code. When the user wants to call the desired number, the dialing code for the desired number is dialed instead of the actual number. The telephone set generates a series of DTMF tones that correspond to the desired number.

If the customer fails to make a permanent record of the desired number, he may have to make a second directory assistance call to find the number. Personal directories can be lost or the data stored in a personal organizer or digital assistant may be accidentally deleted. Telephone sets with speed dialing have limited storage capacity. Perhaps as many as twenty numbers can be stored on a telephone. However, the information in a personal directory and the speed-dialing ability of one phone is useless if the customer does not have his directory or is away from the programmed telephone. For example, the customer may forget to take his personal directory on a trip. Again, the customer is faced with placing a directory assistance call to acquire the desired number.

SUMMARY OF THE INVENTION

The invention is a public network based personal directory system. It includes a translation server for interfacing the telephone set with a site on a computer network that holds frequently dialed numbers of the caller. When calls are made from the caller's own telephone number, a caller identification module in the translation server identifies an address on the computer where the caller's personal directory is stored. As an alternative, the caller may dial a special access number from other locations. Upon entry of an authorization code, the caller is then connected to his personal directory.

The directory is a site on a computer network, such as the Internet. Private networks may also be used, but using the Internet reduces administrative costs. Each subscriber to the personal directory service has a home page at a site located on the World Wide Web. The translation server includes a voice recognition or DTMF module for converting the caller's voice to commands. It also has a text-to-speech module that includes a programmed series of prompts and responses for assisting the subscriber. The subscriber gives his name and/or authorization code. The translation server converts them into the universal resource locator address that corresponds to the identified subscriber. A server locates the web site that includes the home page of the subscriber. Then the subscriber requests the number of one of the names in his personal directory. The voice recognition module converts the spoken name into a home page search request and locates the desired number. Upon confirmation, the translation server passes the call to the telephone network and the network rings the desired number.

The switch receives a telephone call from a caller who requests his personal directory. Dialing a special telephone number does this. The personal directory system has a voice path to the caller through the switch and assumes control of the call from the switch. The personal directory has computer-based equipment that includes one or more memories that store and retrieve a list of home pages for personal directory subscribers. Each subscriber home page has a list of the subscriber's frequently dialed phone numbers and corresponding speed dial codes.

In the preferred embodiment, the home pages are stored on a site located on the Internet. The telephone company that provides the personal directory service maintains that site.

BRIEF DESCRIPTION OF THE DRAWINGS

FIG. 1 is a schematic description of the personal directory system.

DETAILED DESCRIPTION

FIG. 1 shows a personal directory system 10. There are a number of subscribers 12, 14 who can call other subscribers 32, 34. The subscribers are part of a telephone network 100 that includes one or more switches 20. The switches 20 connect one of the calling subscriber 12, 14 to one of the called subscriber 32, 34 in a conventional manner. Those skilled in the art will understand that the telephone network 100 is representative of local, national, and international telephone systems and combinations of such systems. The following explanation will assign certain functions and operations to a telephone company. Those skilled in the art will understand that the telephone company may be any one of the many companies that now provide telephone services, including wired and wireless service.

The telephone network 100 is interfaced and coupled to a computer network 50 via a translation server 40. The translation server 40 is a computer with a central processing unit 47, a memory 48 that includes random access memory, read only memory and mass storage memory. Included in the mass storage memory are addresses of the personal directories of the subscribers 12, 14. The translation server 40 receives calls from subscribers 12, 14 seeking their personal directory. The server 40 has a caller identification module 41 or program that recognizes the telephone number of the calling subscriber 12, 14. The server 40 then compares the identity of the caller to a number of universal resource location addresses that are stored in its memory. When the server 40 matches the caller 12, 14 to the URL corresponding to the caller, the server accesses the URL on the computer network 50.

The computer network 50 is typically a wide area, public access network, such as the World Wide Web (WWW) of the Internet. The Internet 50 has one or more personal directory servers 60 that hold the URLs of the addresses stored in the translation server. Each server 60 has a central processing unit (CPU) 67 and memory 68 (RAM and ROM) for holding operating and applications programs and data corresponding to homepages 61, 62 of subscribers 12, 14. Upon accessing the homepage, the server 60 searches for the telephone number desired by the subscriber and transmits the number to the translation server 40 over the WWW 50.

Each home page 61, 62 stores a personal directory of the respective subscribers 12, 14 along with speed dial codes for each entry. For example, the subscriber may store the number of a first-called party 32 with a speed dial code, such as *88 and the telephone number of a second called party 34 with speed dial code *92. The stored number is supplied to the switch 20 to complete the call.

Translation server 40 has several user-friendly modules to assist callers 12, 14. These modules include a voice recognition module 42 and a text-to-speech module 44. The modules include analog-to-digital converters for input voice signals into digital signals that can be recognized by voice recognition module 42. Likewise, the analog-to-digital converters convert digital signals corresponding to text from the URL locations to voice signals so that the caller will receive the desired number and speed dial code. A telephone company that operates the telephone network 100 maintains the personal directory server 60. Operators 70 and individuals with a Web browser 72 can access the Web site 60 to update the individual homepages 61, 62. The operators 70 can update the speed dial codes associated with the numbers found on the homepages 61, 62.

In operation, a caller 12 dials a personal directory telephone number for the translation server 40. When the server 40 answers, its caller identification module recognizes the calling party as subscriber 12. The caller identification module 41 verifies that the calling party is a subscriber to the personal directory service. The identity of the subscriber is verified by the subscriber supplying a password or by other conventional means. The server 40 looks up the URL for caller 12 and accesses the homepage 61 on the personal directory server 60. The translation server 40 then executes a series of voice prompts and responses to ascertain the identity of the party the subscriber 12 is calling. For example, the server 100 will begin with a voice prompt such as "Please tell me the name of the party you are calling." In response, the subscriber speaks the name of subscriber 32. Let us assume the name is "Don North." The voice recognition module 42 translates the spoken name of the subscriber into digital signals corresponding to the names on the directory of homepage 61. The server 60 provides the telephone number and/or the speed dial code of the called party 32 to the switch 20. The translation server 40 issues a confirmation voice prompt, such as "Confirm that the party you are calling is Don North by pressing 1" and the server 40 passes the number to the switch 20 which dials Don North's telephone number. The translation server 40 in any voice operated Internet protocol (VOIP) or switch 20 in the public service telephone network (PSTN) network dials the dumber of Don North.

Having thus described the general embodiments of the invention, those skilled in the art will appreciate that further changes additions, alterations and deletions may be made to the embodiments without departing from the spirit and the scope of the invention as set forth in the following claims. Those skilled in the art understand that the switch 20 is found in existing equipment such as the DMS 100/200 manufactured by Northern Telecom. Those skilled in the art will also appreciate that the disclosed system may also include a directory assistance system that locates desired numbers and then stores the located number on the personal directory of the subscriber.

What is claimed:

1. A method for providing a telephone number on a public telephone network from a personal directory stored on a computer network, the method comprising the steps of:

establishing a voice connection from a personal directory subscriber to a translation server that holds a computer network address for a personal directory of the subscriber, the personal directory of the subscriber containing a plurality of pairs of names and corresponding telephone numbers, at least one of the plurality of pairs being populated by the caller;

connecting the translation server to a computer network address of the personal directory of the subscriber;

retrieving information from the personal directory at the computer network address, the retrieved information comprising at least one of a telephone number and one of the plurality of pairs of names and corresponding telephone numbers; and confirming by the caller at least one aspect of the retrieved information in response to a voice prompt from the translation server.

2. The method of claim 1, further comprising the step of searching a memory in the translation server for the computer network address of the personal directory of the subscriber.

3. The method of claim 1, wherein the step of confirming comprises confirming, by the caller, the telephone number associated with the retrieved information.

4. The method of claim 1, wherein the step of confirming comprises confirming, by the caller, the name associated with the retrieved information.

5. The method of claim 1, further comprising the step of automatically dialing the retrieved number after the step of confirming.

6. A personal directory system accessible by a voice caller, comprising:

a translation server, responsive to the voice caller, for searching a plurality of stored computer addresses for a computer address corresponding to the caller and establishing a connection, via a computer network, with the corresponding address, said translation server being further configured to receive voice commands from the caller and to issue voice prompts to the caller; and a personal directory server, associated with the corresponding address and responsive to the translation server, for storing a plurality of personal directories, each personal directory comprising personal directory entries, at least one of the personal directory entries being populated by the voice caller, and for accessing a personal directory corresponding to the voice caller, whereby information associated with a selected personal directory entry may be provided from the personal directory corresponding to the voice caller and confirmed by the voice caller in response to a voice prompt from the translation server.

7. The personal directory system of claim 6, wherein the translation server is adapted to be connected to a public telephone network switch and to a computer network.

8. The personal directory system of claim 7, wherein the translation server is further configured to transmit a telephone number associated with the directory entry to the telephone switch to complete a connection on the telephone network.

9. The personal directory system of claim 7, wherein the translation server is further configured to receive a call from the switch requesting access to the caller's personal directory.

10. The system of claim 6, further comprising a text-to-speech module, responsive to the personal directory server, for converting the selected personal directory entry to at least one of a name or telephone number.

11. The system of claim 6, further comprising a voice recognition module responsive to the voice caller, for recognizing the selected a personal directory entry spoken by the voice caller.

12. The system of claim 6, further comprising a caller identification module, responsive to the voice caller, for identifying the voice caller to the translation server, to associate the voice caller with one of the stored computer addresses.

13. The system of claim 6, wherein the translation server is further configured to be responsive to the personal directory server to automatically dial the selected personal directory entry.

14. A personal directory server accessible by a voice caller, comprising:

means for storing a plurality of personal directories, each personal directory including a plurality of personal directory entries, wherein at least one of the personal directory entries includes a telephone number provided by a subscriber associated with the personal directory;

means for associating the voice caller with one of the personal directories;

means for corresponding one of the personal directory entries with a selected personal directory entry provided by the voice caller; and means for confirming by the voice caller, in response to a voice prompt, the corresponding one of the personal directory entries with the selected personal directory entry provided by the voice caller.

15. The personal directory server of claim 14, wherein the means for storing a plurality of personal directories is configured to store the personal directories at different network addresses.

16. The personal directory server of claim 14, wherein each personal directory comprises a plurality of pairs of names of telephony subscribers and their corresponding telephone numbers.

17. The personal directory server of claim 14, wherein the personal directory server further comprises means for searching the stored telephone numbers in the personal directory of the subscriber for a desired telephone number.

18. The personal directory server of claim 14, wherein the personal directory server further comprises means for transmitting a selected stored number in response to a request for the number.

* * * * *